US008100180B2

(12) United States Patent
Reddy et al.

(10) Patent No.: US 8,100,180 B2
(45) Date of Patent: *Jan. 24, 2012

(54) METHOD OF SERVICING A WELLBORE WITH A SEALANT COMPOSITION COMPRISING SOLID LATEX

(75) Inventors: B. Raghava Reddy, Duncan, OK (US); Ronald E. Sweatman, Montgomery, TX (US); Christopher L. Gordon, Oklahoma City, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 86 days.

This patent is subject to a terminal disclaimer.

(21) Appl. No.: 12/622,983

(22) Filed: Nov. 20, 2009

(65) Prior Publication Data

US 2010/0116497 A1 May 13, 2010

Related U.S. Application Data

(63) Continuation of application No. 11/271,174, filed on Nov. 11, 2005, now abandoned, and a continuation-in-part of application No. 12/357,335, filed on Jan. 21, 2009.

(51) Int. Cl.
*E21B 33/13* (2006.01)
(52) U.S. Cl. ......... 166/293; 166/294; 523/130; 523/131
(58) Field of Classification Search .................. 166/293, 166/294; 523/130, 131
See application file for complete search history.

(56) References Cited

U.S. PATENT DOCUMENTS

| | | | |
|---|---|---|---|
| 2,876,841 A | 3/1959 | Ryan | |
| 3,042,608 A | 7/1962 | Morris | |
| 3,359,225 A | 12/1967 | Weisend | |
| 3,487,038 A | 12/1969 | Toy et al. | |
| 3,622,127 A | 11/1971 | Burke, Jr. | |
| 3,793,244 A | 2/1974 | Megee et al. | |
| 3,857,918 A | 12/1974 | Wyss et al. | |
| 3,887,653 A | 6/1975 | Konishi et al. | |
| 3,917,771 A | 11/1975 | Basile | |
| 3,979,303 A | 9/1976 | Kang et al. | |
| 4,062,822 A | 12/1977 | Lesage | |
| 4,182,677 A | 1/1980 | Bocard et al. | |
| 4,301,016 A | 11/1981 | Carriere et al. | |
| 4,384,096 A | 5/1983 | Sonnabend | |
| 4,391,643 A | 7/1983 | Murphey | |
| 4,412,017 A | 10/1983 | Van Eenam | |
| 4,486,316 A | 12/1984 | Carriere et al. | |
| 4,537,918 A | 8/1985 | Parcevaux et al. | |
| 4,664,816 A | 5/1987 | Walker | |
| 4,670,501 A | 6/1987 | Dymond et al. | |
| 4,677,158 A * | 6/1987 | Tso et al. ..................... 524/789 |
| 4,721,160 A | 1/1988 | Parcevaux et al. | |
| 4,767,460 A | 8/1988 | Parcevaux et al. | |
| 4,777,200 A | 10/1988 | Dymond et al. | |
| 4,818,288 A | 4/1989 | Aignesberger et al. | |
| 4,849,018 A * | 7/1989 | Babcock et al. .................. 524/4 |
| 4,861,822 A | 8/1989 | Keskey et al. | |
| 5,135,577 A | 8/1992 | Brothers | |
| 5,151,203 A | 9/1992 | Riley et al. | |
| 5,159,980 A | 11/1992 | Onan et al. | |
| 5,171,802 A * | 12/1992 | Salazar ........................ 526/225 |
| 5,238,064 A | 8/1993 | Dahl et al. | |
| 5,244,304 A | 9/1993 | Weill et al. | |
| 5,290,356 A | 3/1994 | Frankowski | |
| 5,293,938 A * | 3/1994 | Onan et al. ..................... 166/293 |
| 5,296,627 A | 3/1994 | Tang et al. | |
| 5,346,012 A | 9/1994 | Heathman et al. | |
| 5,373,901 A | 12/1994 | Norman et al. | |
| 5,387,626 A | 2/1995 | Böhme-Kovac et al. | |
| 5,389,706 A | 2/1995 | Heathman et al. | |
| 5,403,822 A | 4/1995 | Mueller et al. | |
| 5,456,751 A | 10/1995 | Zandi et al. | |
| 5,563,201 A | 10/1996 | Joanicot et al. | |
| 5,588,488 A | 12/1996 | Vijn et al. | |
| 5,688,844 A | 11/1997 | Chatterji et al. | |
| 5,770,760 A | 6/1998 | Robinson | |
| 5,779,787 A | 7/1998 | Brothers et al. | |
| 5,780,369 A | 7/1998 | Allison et al. | |
| 5,795,924 A | 8/1998 | Chatterji et al. | |
| 5,826,669 A | 10/1998 | Zaleski et al. | |
| 5,873,413 A | 2/1999 | Chatterji et al. | |
| 5,897,699 A | 4/1999 | Chatterji et al. | |
| 5,900,451 A | 5/1999 | Krishnan et al. | |
| 5,911,282 A | 6/1999 | Onan et al. | |
| 5,913,364 A | 6/1999 | Sweatman | |
| 5,945,387 A | 8/1999 | Chatterji et al. | |
| 5,964,293 A | 10/1999 | Chatterji et al. | |
| 6,060,434 A | 5/2000 | Sweatman et al. | |
| 6,063,738 A | 5/2000 | Chatterji et al. | |

(Continued)

FOREIGN PATENT DOCUMENTS

CN             1458114 A      11/2003

(Continued)

OTHER PUBLICATIONS

Schlumberger Oilfield dictionary definition "drilling fluid", printed Dec. 23, 2010.*
Advisory Action dated Mar. 19, 2007 (3 pages), U.S. Appl. No. 10/827,022, filed Apr. 19, 2004.
Advisory Action dated Apr. 12, 2007 (2 pages), U.S. Appl. No. 10/827,022, filed Apr. 19, 2004.
Advisory Action dated Dec. 14, 2007 (3 pages), U.S. Appl. No. 10/827,022, filed Apr. 19, 2004.
Advisory Action dated Jul. 2, 2008 (16 pages), U.S. Appl. No. 11/270,986, filed Nov. 11, 2005.
Advisory Action dated Nov. 10, 2008 (3 pages), U.S. Appl. No. 10/827,022, filed Apr. 19, 2004.

(Continued)

*Primary Examiner* — Alicia Toscano
(74) *Attorney, Agent, or Firm* — Craig W. Roddy; Conley Rose, P.C.

(57) ABSTRACT

A method of servicing a wellbore comprising placing a sealant composition comprising solid latex into the wellbore.

21 Claims, No Drawings

U.S. PATENT DOCUMENTS

| | | | |
|---|---|---|---|
| 6,098,711 A | 8/2000 | Chatterji et al. |
| 6,130,287 A | 10/2000 | Krishnan |
| 6,156,808 A | 12/2000 | Chatterji et al. |
| 6,167,967 B1 | 1/2001 | Sweatman |
| 6,177,483 B1 | 1/2001 | Tehrani et al. |
| 6,209,646 B1 | 4/2001 | Reddy et al. |
| 6,234,251 B1 | 5/2001 | Chatterji et al. |
| 6,258,757 B1 | 7/2001 | Sweatman et al. |
| 6,271,181 B1 | 8/2001 | Chatterji et al. |
| 6,297,202 B1 | 10/2001 | Chatterji et al. |
| 6,328,106 B1 | 12/2001 | Griffith et al. |
| 6,330,917 B2 | 12/2001 | Chatterji et al. |
| 6,367,550 B1 | 4/2002 | Chatterji et al. |
| 6,401,817 B1 | 6/2002 | Griffith et al. |
| 6,448,206 B1 | 9/2002 | Griffith et al. |
| 6,503,870 B2 | 1/2003 | Griffith et al. |
| 6,508,305 B1 | 1/2003 | Brannon et al. |
| 6,508,306 B1 | 1/2003 | Reddy et al. |
| 6,516,884 B1 | 2/2003 | Chatterji et al. |
| 6,518,224 B2 | 2/2003 | Wood |
| 6,527,051 B1 | 3/2003 | Reddy et al. |
| 6,528,563 B2 | 3/2003 | Kaiser et al. |
| 6,534,449 B1 | 3/2003 | Gilmour et al. |
| 6,547,871 B2 | 4/2003 | Chatterji et al. |
| 6,554,071 B1 | 4/2003 | Reddy et al. |
| 6,555,507 B2 | 4/2003 | Chatterji et al. |
| 6,561,273 B2 | 5/2003 | Brothers et al. |
| 6,581,701 B2 | 6/2003 | Heying |
| 6,593,402 B2 | 7/2003 | Chatterji et al. |
| 6,641,660 B1 | 11/2003 | Chatterji et al. |
| 6,645,288 B1 | 11/2003 | Dargaud et al. |
| 6,668,928 B2 | 12/2003 | Brothers |
| 6,702,021 B1 | 3/2004 | Nguyen et al. |
| 6,702,044 B2 | 3/2004 | Reddy et al. |
| 6,715,568 B1 | 4/2004 | Bailey |
| 6,722,433 B2 | 4/2004 | Brothers et al. |
| 6,729,405 B2 | 5/2004 | DiLullo et al. |
| 6,742,592 B1 | 6/2004 | Le Roy-Delage et al. |
| 6,823,940 B2 | 11/2004 | Reddy et al. |
| 6,832,651 B2 | 12/2004 | Ravi et al. |
| 6,837,316 B2 | 1/2005 | Reddy et al. |
| 6,848,519 B2 | 2/2005 | Reddy et al. |
| 6,881,708 B2 | 4/2005 | Reddy et al. |
| 6,887,832 B2 | 5/2005 | Kirsner et al. |
| 6,887,833 B2 | 5/2005 | Brothers et al. |
| 6,889,766 B2 | 5/2005 | Creel et al. |
| 6,902,001 B2 | 6/2005 | Dargaud et al. |
| 6,907,929 B2 | 6/2005 | Leroy-Delage et al. |
| 6,926,081 B2 | 8/2005 | Sweatman et al. |
| 6,957,702 B2 | 10/2005 | Brothers et al. |
| 6,962,201 B2 | 11/2005 | Brothers |
| 6,983,799 B2 | 1/2006 | Reddy et al. |
| 7,007,755 B2 | 3/2006 | Reddy et al. |
| 7,026,272 B2 | 4/2006 | Reddy et al. |
| 7,138,446 B2 | 11/2006 | Reddy et al. |
| 7,143,828 B2 | 12/2006 | Reddy et al. |
| 7,172,022 B2 | 2/2007 | Reddy et al. |
| 7,213,645 B2 | 5/2007 | Sweatman et al. |
| 7,290,614 B2 | 11/2007 | Smith et al. |
| 7,482,309 B2 | 1/2009 | Ravi et al. |
| 7,485,602 B2 | 2/2009 | Kirsner et al. |
| 7,488,705 B2 | 2/2009 | Reddy et al. |
| 7,543,642 B2 | 6/2009 | Reddy et al. |
| 7,607,483 B2 | 10/2009 | Reddy et al. |
| 2002/0022579 A1* | 2/2002 | Griffith et al. ............ 507/220 |
| 2003/0036484 A1 | 2/2003 | Kirsner et al. |
| 2004/0055748 A1 | 3/2004 | Reddy et al. |
| 2004/0168802 A1 | 9/2004 | Creel et al. |
| 2004/0171499 A1 | 9/2004 | Ravi et al. |
| 2005/0061206 A1 | 3/2005 | Reddy et al. |
| 2005/0080176 A1 | 4/2005 | Robb |
| 2007/0111900 A1 | 5/2007 | Reddy et al. |
| 2007/0111901 A1 | 5/2007 | Reddy et al. |
| 2007/0287639 A1 | 12/2007 | Reddy et al. |
| 2009/0137431 A1 | 5/2009 | Reddy et al. |
| 2010/0035772 A1 | 2/2010 | Reddy et al. |

FOREIGN PATENT DOCUMENTS

| | | |
|---|---|---|
| FR | 2780752 A1 | 1/2000 |
| GB | 2271350 A | 4/1994 |
| JP | 2001146457 A | 5/2001 |
| WO | 2004101463 A2 | 11/2004 |
| WO | 2004101951 A1 | 11/2004 |
| WO | 2004101952 A1 | 11/2004 |

OTHER PUBLICATIONS

Baroid product data sheet entitled "BARACARB® bridging agent," 2002, 2 pages, Halliburton.

Baroid brochure entitled "DIAMOND SEAL™ absorbent polymer for lost circulation," 1999, 2 pages, Baroid, a Halliburton PSL.

Baroid product data sheet entitled "DRILTREAT® oil wetting agent," 2002, 1 page, Halliburton.

Baroid product data sheet entitled "EZ MUL® NT emulsifier," 2004, 1 page, Halliburton.

Baroid product data sheet entitled "HYDRO-PLUG™ lost circulation material," 2002, 1 page, Halliburton.

Baroid brochure entitled "HYDRO-PLUG™ lost circulation plug—a single-sack hydrating crystallized polymer blend," Sep. 2002, 2 pages, Halliburton.

Baroid product data sheet entitled "STEELSEAL™ lost circulation material," 2002, 1 page, Halliburton.

Baroid product data sheet entitled STEELSEAL FINE™ lost circulation material, 2002, 1 page, Halliburton.

Claytone® II—Organophilic bentonite, Product Bulletin, http://www.claytone.net/bulletins/CLAY-II.htm, Apr. 15, 2005, 5 pages.

Dalrymple, E. D., et al., "A selective water control process," SPE 24330, 1992, pp. 225-230, Society of Petroleum Engineers, Inc.

Dow Reichhold Specialty Latex LLC, Material Safety Data Sheet, "TYCHEM® 68710-00," Jun. 23, 2004, 7 pages.

Dow Reichhold Specialty Latex LLC™, "TYCHEM® 68710-00," 01-00033-0603RTP, 1 page.

Eoff, Larry, et al.,"Water-dispersible resin system for wellbore stabilization," SPE 64980, 2001, pp. 1-10, Society of Petroleum Engineers, Inc.

Foreign communication from a related counterpart application—International Search Report and Written Opinion, PCT/GB2005/001385, Jul. 26, 2005, 10 pages.

Foreign communication from a related counterpart application—International Search Report and Written Opinion, PCT/GB2005/004455, Apr. 13, 2006, 9 pages.

Halliburton brochure entitled "Accolade™ drilling fluid exceeds new GOM environmental standards and boosts performance," Apr. 2002, 2 pages, Halliburton.

Halliburton brochure entitled "VersaSet™ cementing system," 1996, 2 pages, Halliburton Company.

Halliburton: Advanced Systems for Formation Stability, "Increased integrity with the StrataLock stabilization system," Sep. 1998, 2 pages, Halliburton Energy Services, Inc.

Hallburton: Cementing, "CFR-3™ cement friction reducer—dispersant," Aug. 2004, 2 pages, Halliburton Energy Services, Inc.

Halliburton: Cementing, "DrillAhead® Services," 2004, 1 page, Halliburton.

Halliburton: Cementing, "FlexPlug® OBM—lost-circulation material," Aug. 2004, 2 pages, Halliburton.

Halliburton: Cementing, "FlexPlug® W lost-circulation material," Aug. 2004, 2 pages, Halliburton.

Halliburton: Cementing, "StrataLock™ —wellbore/formation stabilization system," Oct. 2003, 4 pages, Halliburton.

Halliburton: Conformance Solutions, "The PermSeal™ system," Mar. 2002, 2 pages, Halliburton.

Halliburton: Lost Circulation Solutions, "FlexPlugSM service—stop lost circulation, hold your bottom line," 1998, 2 pages, Halliburton Energy Services, Inc.

Halliburton Material Safety Data Sheet entitled "INVERMUL® RF system with BARACARB®," Aug. 22, 2002, pp. 1-7, Halliburton.

Halliburton Material Safety Data Sheet entitled "INVERMUL® RF system with BARODENSE®," Aug. 22, 2002, pp. 1-7, Halliburton.

Halliburton Material Safety Data Sheet entitled "INVERMUL® RF system with BAROID®," Aug. 22, 2002, pp. 1-7, Halliburton.

Halliburton Services marketing publication entitled "HydroChek service—MOC/one slurry for selective water control," 4 pages, Halliburton.

Halliburton: Zonal Isolation Technology, "Bentonite diesel oil slurry (BDO)—lost-circulation material," 2000, 2 pages, Halliburton Energy Services, Inc.

Halliburton: Zonal Isolation Technology, "CFR-2—cement friction reducer," 1999, 2 pages, Halliburton Energy Services, Inc.

Halliburton: Zonal Isolation Technology, "D-AIR 3000 and D-AIR 3000L—defoamers," 1999, 2 pages, Halliburton Energy Services, Inc.

Halliburton: Zonal Isolation Technology, "Diesel-oil cement—water-control system," 1999, 2 pages, Halliburton Energy Services, Inc.

Hallburton: Zonal Isolation Technology, "DOC-3—surfactant," 1999, 2 pages, Halliburton Energy Services, Inc.

Halliburton: Zonal Isolation Technology, "Econolite additive—for cement slurries," 1998, 2 pages, Halliburton Energy Services, Inc.

Halliburton: Zonal Isolation Technology, "Flo-Chek® service—lost-circulation service," 2000, 2 pages, Halliburton Energy Services, Inc.

Halliburton: Zonal Isolation Technology, "Halad®-447—fluid-loss additive," 1999, 2 pages, Halliburton Energy Services, Inc.

Halliburton: Zonal Isolation Technology, "LA-2—latex fluid-loss additive," 1999, 2 pages, Halliburton Energy Services, Inc.

Halliburton: Zonal Isolation Technology, "Latex 2000—cement additive," 1998, 2 pages, Halliburton Energy Services, Inc.

Halliburton: Zonal Isolation Technology, "Silicalite—cement additive," 1999, 2 pages, Halliburton Energy Services, Inc.

Halliburton: Zonal Isolation Technology, "Stabilizer 434B—latex stabilizer," 1999, 2 pages, Halliburton Energy Services, Inc.

Halliburton: Zonal Isolation Technology, "Stabilizer 434C—surfactant," 1998, 2 pages, Halliburton Energy Services, Inc.

Mark, Herman F., Editor, "Encyclopedia of polymer science and engineering," vol. 11, Second Edition, 1988, pp. 45-95 plus cover page and 2 publishing pages, John Wiley & Sons, Inc.

Office Action dated Jun. 13, 2006 (5 pages), U.S. Appl. No. 10/827,022, filed Apr. 19, 2004.

Office Action dated Aug. 7, 2006 (16 pages), U.S. Appl. No. 10/827,022, filed Apr. 19, 2004.

Office Action dated Jan. 17, 2007 (9 pages), U.S. Appl. No. 10/827,022, filed Apr. 19, 2004.

Office Action dated May 16, 2007 (8 pages), U.S. Appl. No. 10/827,022, filed Apr. 19, 2004.

Office Action dated Aug. 20, 2007 (21 pages), U.S. Appl. No. 11/270,986, filed Nov. 11, 2005.

Office Action (Final) dated Oct. 12, 2007 (9 pages), U.S. Appl. No. 10/827,022, filed Apr. 19, 2004.

Office Action dated Dec. 26, 2007 (14 pages), U.S. Appl. No. 11/270,986, filed Nov. 11, 2005.

Office Action dated Mar. 5, 2008 (19 pages), U.S. Appl. No. 10/827,022, filed Apr. 19, 2004.

Office Action dated May 16, 2008 (8 pages), U.S. Appl. No. 11/270,986, filed Nov. 11, 2005.

Office Action dated May 28, 2008 (29 pages), U.S. Appl. No. 11/271,174, filed Nov. 11, 2005.

Office Action (Final) dated Aug. 28, 2008 (12 pages), U.S. Appl. No. 10/827,022, filed Apr. 19, 2004.

Office Action dated Sep. 11, 2008 (13 pages), U.S. Appl. No. 11/270,986, filed Nov. 11, 2005.

Office Action (Final) dated Nov. 4, 2008 (22 pages), U.S. Appl. No. 11/271,174, filed Nov. 11, 2005.

Office Action dated Jan. 8, 2009 (14 pages), U.S. Appl. No. 10/827,022, filed Apr. 19, 2004.

Office Action dated Mar. 25, 2009 (36 pages), U.S. Appl. No. 11/744,337, filed May 4, 2007.

Office Action dated Apr. 6, 2009 (23 pages), U.S. Appl. No. 11/271,174, filed Nov. 11, 2005.

Office Action (Final) dated May 11, 2009 (20 pages), U.S. Appl. No. 11/270,986, filed Nov. 11, 2005.

Schlumberger Oilfield Glossary, "gyp mud" definition, http://www.glossary.oilfield.slb.com/Display.cfm?Term=gyp%20mud, May 23, 2008, 1 page, Schlumberger Limited.

Sweatman, Roland, E., et al., "New solutions to remedy lost circulation, crossflows, and underground blowouts," SPE/IADC 37671, 1997, pp. 1-16, SPE/IADC Drilling Conference.

Advisory Action dated Jul. 20, 2009 (6 pages), U.S. Appl. No. 11/270,986, filed Nov. 11, 2005.

Notice of Allowance dated Aug. 14, 2009 (6 pages), U.S. Appl. No. 10/827,022, filed Apr. 19, 2004.

Office Action (Final) dated Aug. 21, 2009 (29 pages), U.S. Appl. No. 11/271,174, filed Nov. 11, 2005.

Office Action (Final) dated Nov. 5, 2009 (18 pages), U.S. Appl. No. 11/744,337, filed May 4, 2007.

Dow Reichhold Material Safety Data Sheet entitled "TYCRYL® BS-2100," Dec. 25, 2005, 8 pages, Dow Reichhold Specialty Latex LLC.

Halliburton Material Safety Data Sheet entitled "ZoneSeal® 3000," Jan. 3, 2008, pp. 1-5, Halliburton.

Halliburton Material Safety Data Sheet entitled "ZoneSealant 2000," Jan. 4, 2010, pp. 1-6, Halliburton.

Rhodia Technical Data Sheet entitled, "Rhoximat PSB 150," http://www.specialchem4adhesives.com/common/as/product/displayproduct.aspx?id=2013&, 2010, 1 page, SpecialChem S. A.

Office Action dated Dec. 29, 2010 (45 pages), U.S. Appl. No. 12/539,381, filed Aug. 11, 2009.

Office Action dated Mar. 28, 2011 (16 pages), U.S. Appl. No. 11/744,337, filed May 4, 2007.

Office Action (Final) dated May 2, 2011 (25 pages), U.S. Appl. No. 12/539,381, filed Aug. 11, 2009.

\* cited by examiner

METHOD OF SERVICING A WELLBORE WITH A SEALANT COMPOSITION COMPRISING SOLID LATEX

CROSS-REFERENCE TO RELATED APPLICATIONS

This application is a continuation of U.S. patent application Ser. No. 11/271,174, filed Nov. 11, 2005 by B. Raghava Reddy, et al., now published as U.S. 2007/0111901 A1, and entitled "Method of Servicing a Wellbore with a Sealant Composition Comprising Solid Latex" which is related to commonly owned U.S. patent application Ser. Nos. 11/270,986, filed Nov. 11, 2005, now published as U.S. 2007/0111900 A1, and 12/539,381 filed Aug. 11, 2009, by B. Raghava Reddy, et al. and entitled "Sealant Compositions Comprising Solid Latex," all of which are incorporated herein by reference as if reproduced in their entirety. This application also is a continuation-in-part of U.S. patent application Ser. No. 12/357,335, filed Jan. 21, 2009 by B. Raghava Reddy, et al., now published as U.S. 2009/0137431 A1, and entitled "Oilwell Sealant Compositions Comprising Alkali Swellable Latex" which is a continuation of U.S. patent application Ser. No. 11/010,117, filed Dec. 8, 2004 by B. Raghava Reddy, et al., now issued as U.S. Pat. No. 7,488,705 B2, and entitled "Oilwell Sealant Compositions Comprising Alkali Swellable Latex," both of which are incorporated herein by reference as if reproduced in their entirety.

STATEMENT REGARDING FEDERALLY SPONSORED RESEARCH OR DEVELOPMENT

Not applicable.

BACKGROUND OF THE INVENTION

1. Field of the Invention

This invention relates to servicing a wellbore. More specifically, it relates to the use of solid latex in wellbore servicing fluids.

2. Background of the Invention

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Fluids used in servicing a wellbore may be lost to the subterranean formation while circulating the fluids in the wellbore. These fluids may enter the subterranean formation via various types of leak-off flow paths in permeable zones such as depleted zones, zones of relatively low pressure, lost circulation zones having naturally occurring fractures, weak zones having fracture gradients exceeded by the hydrostatic pressure of the servicing fluid, and so forth. As a result, the service provided by such fluids is more difficult to achieve. Also, the loss of such fluids increases the cost of the overall operation due to the prolonged rig time required, the fluids being relatively expensive, and possibly a need to install additional casing.

There are a variety of methodologies for combating drilling fluid circulation losses. Such methodologies may involve adding loss prevention materials to the drilling fluid itself and continue the drilling process or pump fluid until fluid circulation is restored or may involve the use of a two-stream process. In a two-stream process, two fluid streams are introduced to the loss circulation area, for example by pumping one stream down the drillstring and one stream down the annulus, or alternatively via sequential pumping down the drillstring, annulus or both. These streams when mixed downhole near the loss circulation zones combine to rapidly form a viscous mass, which is designed to prevent further loss of drilling fluid into the fractures.

When such methods are successful in mitigating drilling fluid circulation losses, the operators have two options for follow-up operations. Their first option is to temporarily stop the drilling operation, case the well bore and cement the casing before resuming further drilling. This may result in a reduced well bore diameter from that point forward resulting in a smaller than planned pipe across the production intervals. During production, these reduced production pipe string diameters induce high friction pressures that restrict or limit production rates and negatively effect well production economics. This practice is adapted when the loss circulation sealant is not strong enough to withstand hydrostatic pressure of the drilling fluid if drilling is resumed without casing the well bore. The second option is more economical during the well construction phase and more profitable during the production phase. The second option involves using a loss circulation sealant that provides sufficient strength and reinforcement to the loss circulation zone so that it can withstand hydrostatic pressure from further drilling without resorting to casing the wellbore. This strengthening process is often referred to as increasing the Wellbore Pressure Containment Integrity (WPCI). This will not only save the cost of installing the extra casing or liner pipe strings, but it will also allow well completion with the planned well bore diameter that is required to achieve the expected production rates. In some cases, it will also lead to a wider than planned well bore diameter which after well completion and suitable stimulation operations, may facilitate increased production rates. The second option is a process referred to as a "Drill Ahead" process in the industry and in the later sections of this application. A "Drill Ahead" process and associated methods for introducing WPCI compositions into a wellbore to seal subterranean zones are described in U.S. Pat. No. 6,926,081B2, and in U.S. patent application Ser. No. 10/350,429 entitled "Methods of Improving Well Bore Pressure Containment Integrity" and filed on Jan. 24, 2003, which are incorporated by reference herein in their entirety.

Sealant compositions for use in fluid circulation losses may contain modifiers to enhance the mechanical properties of the sealant. Latex emulsions, which may contain a stable water-insoluble, polymeric colloidal suspension in an aqueous solution, are commonly used in sealant compositions to improve the properties of those compositions. For example, latex emulsions are used in cement compositions to reduce the loss of fluid there from and to reduce the cement's permeability to gas thereby substantially increasing the cement's resistance to gas flow from a gas-bearing formation. Latex emulsions are also employed to reduce the brittleness and improve the flexibility of sealant compositions; otherwise, the compositions may shatter under the impacts and shocks generated by drilling and other well operations. For example, with regard to fluid circulation loss, a two-stream process has been used where the first stream may be the drilling fluid itself or a designed fluid containing key ingredients while the second stream may comprise a latex emulsion. This process has found good commercial success in combating drilling fluid circulation losses especially in the case of oil-based muds (OBM).

The use of latex emulsions for combating drilling fluid circulation losses has some disadvantages. In the case of the two stream processes, preparing the latex-containing stream is operationally cumbersome and requires mixing an aqueous latex fluid, an aqueous stabilizing liquid surfactant and a dry solids blend prior to placing in a wellbore. This operation requires storage of two fluid components and a dry solid component. Also, there can be a substantial costs incurred for the shipping, storing and handling of latex emulsions. Furthermore, latex emulsions and the aqueous stabilizing surfactants present potential spill and leak related health, safety and environment (HSE) hazards. Frequently, it is operationally preferred and more cost effective to design cement slurries that use all solid components so that a single dry blend can be made in a bulk blending facility and transported to the field location where it is mixed with water prior to pumping. Use of aqueous latex emulsion requires more complex mixing operations.

Given the foregoing problems it would be desirable to develop a method of reducing the costs and HSE hazards associated with the use of latex in sealant compositions. Furthermore, it would be desirable to develop a method of preparing sealant compositions with latex that is operationally facile.

BRIEF SUMMARY OF SOME OF THE PREFERRED EMBODIMENTS

Disclosed herein is a method of servicing a wellbore comprising placing a sealant composition comprising solid latex into the wellbore.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE PREFERRED EMBODIMENTS

Disclosed herein are sealant compositions comprising a solid latex. Such compositions may additionally comprise cement. Such compositions may additionally comprise an organophilic clay, one or more viscosifiers, or combinations thereof. In various embodiments, the sealant composition comprises a solid latex and cement; alternatively, a solid latex, cement, and an organophilic clay; alternatively, a solid latex, cement, and one or more viscosifiers; alternatively a solid latex, cement, an organophilic clay and one or more viscosifiers; alternatively solid latex and organophilic clay; alternatively solid latex and one or more viscosifiers; or alternatively a solid latex, organophilic clay, and one or more viscosifiers. In various embodiments, the sealant composition comprising a solid latex may be contacted with one or more other fluids prior to, during, after, or concurrently with being placed down hole, for example contact with an oil based mud (OBM), a water based mud (WBM), an aqueous fluid containing a pH increasing material, or a combination thereof.

The sealant composition can be used for any purpose, for example as loss circulation fluids, fracture sealants, zonal isolation fluids, and cementing fluids. In an embodiment, the sealant composition may be used to service a wellbore that penetrates a subterranean formation. It is to be understood that "subterranean formation" encompasses both areas below exposed earth and areas below earth covered by water such as ocean or fresh water. Without limitation, servicing the wellbore includes positioning the sealant composition in the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or combinations thereof.

In an embodiment, the sealant composition comprises a solid latex, a reconstituted solid latex or combinations thereof. Herein a "solid latex" refers to latex which is a free flowing particulate material that is substantially dry or free of fluid. Solid latexes may be prepared by removing water from any emulsion polymerized polymer systems such as those to be described herein. Methods of removing the water from emulsion polymerized polymer systems are known to one of ordinary skill in the art and include without limitation techniques such as spray drying. Herein a "reconstituted solid latex" refers to a latex solution or emulsion, typically a stable emulsion, that is prepared from a solid latex. Herein "reconstituting" refers to the process of resuspending or solvating a solid latex in a suitable fluid. Aqueous fluids such as fresh or salt water and/or nonaqueous fluids such as diesel, kerosene, mineral oil, esters, linear and poly alpha-olefins, or combinations thereof may be used to resuspend the solid latex and form a stable latex emulsion. A reconstituted solid latex is formed from dry latex particles, which is in contrast to a liquid latex emulsion that is formed by emulsion polymerization in which the polymer particles have remained in a liquefied state and have not undergone a dry, particulate state.

An emulsion polymerized latex system may comprise monomers that include polar monomers and non-polar monomers such as ethylenically unsaturated carboxylic acids (e.g., acrylic acid), vinyl nitrile (e.g., acrylonitrile), aromatic and aliphatic olefins and dienes, or combinations thereof. For example, the solid latex may comprise latex formed from monomers that include, without limitation, vinyl aromatic monomers (e.g., styrene based monomers), ethylene, butadiene, vinylnitrile (e.g., acrylonitrile), olefinically unsaturated esters of $C_1$-$C_8$ alcohol, ethylenically unsaturated carboxylic acids, or combinations thereof. In some embodiments, nonionic monomers that exhibit steric effects and that contain long ethoxylate or hydrocarbon tails may also be present. Other suitable types of solid latexes may be prepared from colloidally stabilized or alkali swellable latexes as disclosed herein. Suitable emulsifying surfactants may be included during the polymerization phase to obtain a stable emulsion. An example of a solid latex includes without limitation RHOXIMAT PSB 150 latex powder which is a styrene butadiene copolymer resin in powder form commercially available from Rhodia Corporation, Cranbury, N.J.

In an embodiment, the solid latex is prepared from a colloidally stabilized latex emulsion. As used herein, "colloidally stabilized latex emulsion" refers to a latex comprising polymer particles suspended in an aqueous solution and at least one protective colloid for providing stabilization to the colloidal polymer emulsion. Protective colloids known in the art may be employed in the colloidally stabilized latex emulsion. Examples of suitable protective colloids include, but are not limited to, partially and fully hydrolyzed polyvinyl alcohols, cellulose ethers such as hydroxymethyl cellulose, hydroxyethyl cellulose, hydroxypropyl cellulose, starch and starch derivatives, and carboxymethyl cellulose, natural and synthetic gums such as gum tragacanth and gum arabic, polyacrylic acid, acrylates, poly(vinyl alcohol)co(vinyl amine) copolymers, and combinations thereof.

In an embodiment, the polymer contained in the colloidally stabilized latex emulsion may comprise an aliphatic conjugated diene monomer and at least one additional monomer comprising a non-aromatic unsaturated mono- or di-carboxylic ester monomer, an aromatic unsaturated monomer, at least one nitrogen-containing monomer, or combinations thereof. Examples of suitable aliphatic conjugated diene monomers include, but are not limited to, $C_4$ to $C_9$ dienes such as butadiene monomers, e.g., 1,3-butadiene, 2-methyl-1,3-butadiene, 2 chloro-1,3 butadiene, 2-methyl-1,3-butadiene, and 2 chloro-1,3-butadiene. Blends or copolymers of the diene monomers may also be used. Examples of suitable non-aromatic unsaturated monocarboxylic ester monomers include, but are not limited to, acrylates, methacrylates, and combinations thereof. The acrylates and methacrylates may include functional groups such as amino groups, hydroxy groups, and epoxy groups. Examples of suitable non-aromatic unsaturated dicarboxylic ester monomers include, but are not limited to, alkyl and dialkyl fumarates, itaconates, maleates, and combinations thereof, with the alkyl group having from one to eight carbons. In an embodiment, a non-aromatic unsaturated monocarboxylic ester monomer employed in the colloidally stabilized latex is methyl methacrylate. Examples of suitable aromatic unsaturated monomers include, but are not limited to, styrene and styrene derivatives such as alphamethylstyrene, p-methyl styrene, divinyl benzene, vinyltolunene, divinyl toluene, ethylstyrene, tert-butyl styrene, monochlorostyrene, dichlorostyrene, vinyl benzyl chloride, fluorostyrene, alkoxystyrenes (e.g., paramethoxystyrene), and combinations thereof. In an embodiment, an aromatic unsaturated monomer included in the colloidally stabilized latex is styrene. Examples of suitable nitrogen-containing monomers include, but are not limited to, acrylonitrile, methacrylonitrile, acrylamide, methacrylamide, N-methylolacrylamide, alkylated N-methylolacrylamides such as N-methoxymethylacrylamide and N-butoxymethylacrylamide, acrolein, and combinations thereof. In an embodiment, a nitrogen-containing monomer included in the colloidally stabilized latex is acrylonitrile.

In one embodiment, the colloidally stabilized latex also includes a surfactant having ethylenic unsaturation, an oxyalkylene functional monomer, or combinations thereof incorporated in the backbone of the polymer. The surfactant is copolymerized with the aliphatic conjugated diene monomer and the additional monomer and may be located at the surface of the polymer particles. Since the surfactant is an integral part of the polymer, it most likely cannot desorb from the polymer. Examples of suitable surfactants are disclosed in U.S. Pat. No. 5,296,627, which is incorporated by reference herein in its entirety. The surfactant may have a hydrophobic portion that possesses terminal ethylenic unsaturation and a hydrophilic portion that contains a poly(alkyleneoxy) segment. Examples of suitable oxyalkylene functional monomers include, but are not limited to, monoesters of carboxylic acid or dicarboxylic acid, diesters of dicarboxylic acid, compounds generally represented by the following formulas, and combinations thereof:

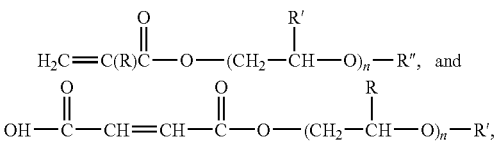

where R is hydrogen or a $C_1$-$C_4$ alkyl, R' is hydrogen or a $C_1$-$C_4$ alkyl, R" is hydrogen or a $C_1$-$C_4$ alkyl, and n is in a range of from 1 to 30. The oxyalkylene functional monomer is copolymerized with the aliphatic conjugated diene monomer and the additional monomer. Additional examples of surfactants and oxyalkylene functional monomers that may be employed in the colloidally stabilized latex are provided in aforementioned U.S. Pat. No. 5,900,451 which is incorporated by reference herein in its entirety.

In the foregoing embodiment in which the colloidally stabilized latex includes a surfactant having ethylenic unsaturation and/or an oxyalkylene functional monomer, the amount of protective colloid present in the colloidally stabilized latex is in the range of from about 0.1 percent (hereinafter "%") to about 10% by total weight of the starting monomers, alternatively from about 1% to about 8%, alternatively from about 2% to about 6%. The amount of aliphatic conjugated diene monomer present in the colloidally stabilized latex is in the range of from about 5% to about 95% by total weight of the starting monomers, alternatively from about 20% to about 80%. The amount of non-aromatic unsaturated mono- or di-carboxylic ester monomer present in the colloidally stabilized latex is in the range of from about 5% to about 95% by total weight of the starting monomers, alternatively from about 20% to about 80%. The amount of aromatic unsaturated monomer present in the colloidally stabilized latex is in the range of from about 5% to about 95% by total weight of the starting monomers, alternatively from about 20% to about 80%. The amount of nitrogen-containing monomer present in the colloidally stabilized latex is in the range of from about 5% to about 95% by total weight of the starting monomers, alternatively from about 20% to about 80%. The amount of surfactant present in the colloidally stabilized latex is in the range of from about 0.1% to about 5% by total weight of the starting monomers, alternatively from about 1% to about 4%, alternatively from about 2% to about 3%. The amount of oxyalkylene functional monomer present in the colloidally stabilized latex is in the range of from about 0.1% to about 7% by total weight of the starting monomers, alternatively from about 1% to about 3%. When the surfactant and the oxyalkylene functional monomer are both used, the colloidally stabilized latex may contain from about 0.5% to about 2% of the surfactant and from about 1% to about 3% of the oxyalkylene functional monomer by total weight of the starting monomers.

In another embodiment, the colloidally stabilized latex includes a functionalized silane incorporated in the polymer that is capable of adsorbing the protective colloid. Examples of suitable functionalized silanes are generally represented by the following formula:

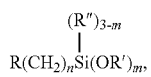

where R" is a $C_1$ to $C_5$ alkyl, R' is a $C_1$ to $C_5$ alkyl, R is SH, $CH_2$=CH—, $CH_2$=C($CH_3$)—C(O)O—, $CH_2$=CH—C(O)O—, and

n is in a range of from 1 to 10, and m is 2 or 3. An example of a suitable functionalized silane includes without limitation, gamma mercaptopropyl trimethoxy silane in which R is SH, R' is $C_1$ alkyl, n is 3, and m is 3. Unsaturated mono- or di-carboxylic acid monomers and derivatives thereof, such as acrylic acid, methacrylic acid, itaconic acid, fumaric acid, and malieic acid, may also be employed in the colloidally stabilized latex. Additional examples of surfactants and oxyalkylnlene functional monomers that may be employed in the colloidally stabilized latex are provided in U.S. Pat. No. 6,130,287, which is incorporated by reference herein in its entirety.

In the foregoing embodiment in which the colloidally stabilized latex includes a functionalized silane, the amount of protective colloid present in the latex is in the range of from about 1 percent (hereinafter "%") to about 10% by total weight of the starting monomers. The amount of aliphatic conjugated diene monomer present in the colloidally stabilized latex is in the range of from about 1% to about 99% by total weight of the starting monomers, alternatively from about 10% to about 70%, alternatively from about 20% to about 50%. The amount of non-aromatic unsaturated mono- or di-carboxylic ester monomer present in the colloidally stabilized latex is in the range of from about 1% to about 99% by total weight of the starting monomers, alterntaively from about 50% to about 80%. The functionalized silane may be present in the colloidally stabilized latex in various amounts. For example, the amount of silane present in the polymer may range from about 0.01% to about 2% by total weight of the starting monomers, alternatively about 0.5%.

Examples of suitable colloidally stabilized latexes for use in the sealant compositions and methods of making such latexes are described in U.S. Pat. Nos. 5,900,451 and 6,130,287, referenced previously. In those patents, the colloidally stabilized latexes are referred to as "stabilized emulsion polymers." An example of a suitable latex includes without limitation a carboxylated butadiene acrylonitrile latex sold as BS2100 by Dow Reichhold Inc.

In an embodiment, the solid latex is prepared from an alkali swellable latex. "Alkali swellable latex" is defined as a latex material that, when exposed to pH increasing materials, may swell and exhibit an increase in viscosity. Such pH increasing materials may be added to the latex emulsion prior to pumping or may be caused to mix with the latex down hole, for example in a two-stream pumping method. Examples of pH increasing materials include without limitation alkali, alkaline earth, and transition metal hydroxides, carbonates, bicarbonates, phosphates, organic amines and the like in encapsulated or unencapsulated form. In an embodiment, a sealant composition comprises an alkali swellable solid latex and a pH increasing material.

Alkali swellable latexes typically contain, in addition to the typical latex forming monomers, monomers having acidic groups capable of reacting with the pH increasing materials thereby forming anionic pendant groups on the polymer backbone. Alkali swellable latex emulsions, due to the presence of acidic groups, have a pH in the range of from about 2 to about 8 and are predominantly low viscosity fluids with viscosities less than about 100 centipoise for an emulsion containing about 30% to 50% solids. When the pH is increased by the addition of a pH increasing material, the viscosity increase may be in the range of from about five times to more than about a million times for a 30% emulsion. The conventional latex emulsion does not significantly increase in viscosity upon the addition of a pH increasing material. In some embodiments, the latex emulsion may be partially cross-linked during the polymerization phase of the monomers. Examples of typical latex forming monomers that may be used to make alkali swellable latexes include, without limitation, vinyl aromatic monomers (e.g., styrene based monomers), ethylene, butadiene, vinylnitrile (e.g., acrylonitrile), olefinically unsaturated esters of $C_1$-$C_8$ alcohol, or combinations thereof. In some embodiments, non-ionic monomers that exhibit steric effects and that contain long ethoxylate or hydrocarbon tails may also be present. The monomers containing acid groups capable of reacting with pH increasing materials include ethylenically unsaturated monomers containing at least one carboxylic acid functional group. Such carboxylic acid containing monomers may be present in the range of from about 5% to about 30% by weight of the total monomer composition used in preparing the alkali swellable latex. Without limitation, examples of such carboxylic acid containing groups include acrylic acid, alkyl acrylic acids, such as methacrylic acid and ethacrylic acid, alpha-chloro-acrylic acid, alpha-cyano acrylic acid, alpha-chloro-methacrylic acid, alpha-cyano methacrylic acid, crotonic acid, alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, or combinations thereof. In an embodiment, the carboxylic acid containing groups can include itaconic acid, acrylic acid, or combinations thereof.

The preparation of such alkali swellable latexes is discussed in U.S. Pat. Nos. 3,793,244; 4,861,822; and 5,563,201, which are incorporated herein by reference in their entirety. An example of a commercially available alkali swellable dry solid latex includes without limitation TYCHEM CPS 986 available from Dow Reichhold, Research Triangle, N.C.

In an embodiment, the latex materials disclosed herein are originally in an emulsified form, e.g., a colloidally stabilized latex, and are converted to a solid form through the removal of water as previously described. In another embodiment, a solid latex is reconstituted into a latex emulsion through the addition of water. The latex materials, as a solid, a reconstituted emulsion, or combinations thereof, may be incorporated into the sealant compositions to improve the physical and mechanical properties thereof. The relative amounts of the latex in a particular sealant composition depend upon the intended use of the resulting composition. For example, a cementitious sealant composition may contain from about 0.1% to about 25% solid latex by weight of cement (bwoc), alternatively from about 0.5% to about 20% solid latex bwoc, alternatively from about 1% to about 20% solid latex bwoc, alternatively from about 1% to about 15% solid latex bwoc, alternatively from about 1% to about 10% solid latex bwoc. In compositions without cement, the amount of solid latex may be in the range of 5% to 50% by weight of the total composition, alternatively, 10% to 35% by weight of the total composition, alternatively 15% to 25% by weight of the total composition.

In an embodiment, the sealant composition comprises a cement. The sealant composition may comprise a cement such as hydraulic cement, which includes calcium, aluminum, silicon, oxygen, and/or sulfur and which sets and hardens by reaction with water. Examples of hydraulic cements include but are not limited to Portland cements (e.g., classes A, C, G, and H Portland cements), pozzolana cements, gypsum cements, phosphate cements, high alumina content cements, silica cements, high alkalinity cements, and combinations thereof.

In an embodiment, the sealant composition includes a sufficient amount of water to form a pumpable cementitious slurry. The water may be fresh water or salt water, e.g., an unsaturated aqueous salt solution or a saturated aqueous salt solution such as brine or seawater. The water may be present in the amount from about 20 to about 180 percent by weight of cement, alternatively from about 28 to about 60 percent by weight of cement. The cement compositions may comprise a density from about 4 lb/gallon to about 23 lb/gallon. In alternative embodiments, the cement compositions may comprise a density from about 12 lb/gallon to about 17 lb/gallon. In other alternative embodiments, the cement compositions may be low-density cement compositions with a density from about 6 lb/gallon to about 14 lb/gallon.

In an embodiment, the sealant composition comprises an organophilic clay. Without wishing to be limited by theory, the organophilic clay may interact by absorption with any oil present in the non-aqueous oil-based drilling fluid, in the formation (for example in the lost circulation zone), or pumped as a two-stream component. The interaction of the organophillic clay and the oil may increase the viscosity of the sealant composition, thus aiding in the formation of a solidified mass with improved dimensional stability under imposed stresses. Additionally, the absorption of oil from an oil-based drilling fluid containing an internal aqueous brine phase may lead to destabilization of the drilling fluid resulting in release of aqueous brine which will coagulate the latex to form a resilient rubbery sealant mass. The amount of organophilic clay present in the sealant composition may be in a range of from about 0.5% to about 50% by weight of the composition, alternately from about 5% to about 35% by weight of total composition, and alternately from about 10% to about 30% by weight of total composition. When an organic solvent is used as a suspending solvent for the solid latex, organophilic clay also may serve as a supending aid to prevent settling of the solid latex particles. Without limitation, a suitable organophilic clay is an alkyl quaternary ammonium bentonite clay sold as CLAYTONE II by Southern Clay Products.

To improve the suspending ability of the sealant composition, particularly when they are aqueous fluids, viscosifying agents suitable for increasing the viscosity of the sealant composition may be employed. Examples of such viscosifying agents include without limitation hydroxylethylcellulose, hydroxypropylcellulose, guar gum, hydroxyethyl- or hydroxypropyl-guar gum, etc. In an embodiment, a viscosifying agent is present in the sealant composition in an amount of from about 0.01% to about 1% by weight of the total composition.

In an embodiment the sealant composition comprises cross-linking agents that cross-link the latex and form a less deformable resilient rubbery composition. Such cross-linking agents, along with cross-linking accelerators and retarders, are known to those skilled in the art. In other embodiments, the solid latex may contain crosslinking agents that are suitable for facilitating the formation of a resilient rubbery mass, which may be used during the polymerization stage of the monomers or added to the latex prior to use (for example to the sealant composition). In embodiments wherein the solid latex contains vulcanizable groups such as the diene type of monomers, crosslinking agents including vulcanizing agents such as sulfur, 2,2'-dithiobisbenzothiazole, organic peroxides, azo compounds, alkylthiuram disulfides, selenium phenolic derivatives and the like; vulcanization accelerators such as fatty acids (e.g., stearic acid), metallic oxides (e.g., zinc oxide), aldehyde amine compounds, guanidine compounds, disulfide thiuram compounds, and the like; vulcanization retarders such as salicylic acid, sodium acetate, phthalic anhydride and N-cyclohexyl thiophthalimide; defoamers; or combinations thereof may be added just prior to use, for instance to a sealant composition. Such compositions are discussed in U.S. Pat. No. 5,293,938, which is incorporated by reference herein in its entirety. If the crosslinking agent is used during production of the latex, it may be a multifunctional monomer with more than one polymerizable group for example divinylbenzene, trimethylolpropane triacrylate, tetraethyleneglycol diacrylate, methylene bisacrylamide, and the like. The type and amounts of the cross-linking agents will depend on the temperature, and the rate at which the cross-linking will take place. Methods for determination of the amount of cross-linking agent based on the reaction conditions are known to one of ordinary skill in the art.

In some embodiments, additives may be included in the sealant composition for improving or changing the properties thereof. Examples of such additives include but are not limited to salts, accelerants, set retarders, defoamers, settling prevention agents, weighting materials, dispersants, vitrified shale, formation conditioning agents, or combinations thereof. Other mechanical property modifying additives, for example, carbon fibers, glass fibers, metal fibers, minerals fibers, and the like can be added to further modify the mechanical properties or to aid further in preventing fluid losses.

Surfactants may be added to foam the cement slurry, to stabilize a foamed cement slurry, to stabilize a cement slurry containing a solid latex against premature gellation or combinations thereof. Such surfactants may be anionic, alternatively noionic, and alternatively zwitterionic. Examples of surfactants that stabilize latex emulsions in cement slurries against premature gelling include without limitation STABILIZER 434B latex stabilizer and STABILIZER 434C latex stabilizer neutral which are nonionic surfactants both available from Halliburton Energy Services. Examples of other surfactants suitable for use in this disclosure include without limitation ZONESEAL 2000 chemical additive used in foam cementing applications and ZONESEAL 3000 chemical additive used in foam cementing applications which are both foaming and foam stabilizing surfactants commercially available from Halliburton Energy Services.

Any of the additives disclosed herein or known to one of ordinary skill in the art may be included singularly or in combination. Methods for introducing these additives and their effective amounts are known to one of ordinary skill in the art.

In an embodiment, the sealant composition comprising a solid latex is contacted with a drilling mud. During drilling, a continuous flow of drilling 'mud' is circulated in the well. This mud is actually a thick mix of clay and other chemical additives in water or mineral oil, as well as weighting agents such as barite (barium sulphate) to add weight. Drilling mud lubricates the bit, contains formation pressures, keeps the hole from collapsing and flushes rock chips and drill cuttings to the surface. Two basic types of drilling fluids, or muds, are used in oil exploration and production: water-based (WBM) and oil-based muds (OBM). In an embodiment, the sealant composition comprising a solid latex may be mixed with a OBM in a ratio varying from 10% to 90% by volume. Alternatively, the sealant composition comprising a solid latex may be mixed with a WBM in a ratio varying from 10% to 90% by volume.

In an embodiment, a pH-increasing additive (for example alkali, alkaline earth and transition metal hydroxides, carbonates, bicarbonates, phosphates, organic amines and the like) is added to the mud prior to contacting with the fluid containing the solid latex, for example an alkali swellable solid latex. For example, the pH of the mud (e.g., a WBM) may be adjusted to from about 10 to about 13 before contacting with the fluid containing solid latex, for example an alkali swellable solid latex. In an embodiment, the sealant composition may be mixed with either a WBM or an OBM in the vicinity of loss circulation zone in a two-stream method.

The addition of a solid latex or reconstituted solid latex to a sealant composition comprising a cement may improve the mechanical properties of the cement composition. Examples of improved mechanical properties include without limitation increased tensile strength, increased compressive strength, reduced elastic modulus and reduced brittleness. The addition of a solid latex to a cement composition may improve the tensile strength when compared to a similar formulation containing a liquid latex by from about 5% to about 50%, alternatively from about 10% to about 50%.

Sealant compositions comprising a solid latex and a cement may also produce cement formations that are able to withstand the stresses associated with cyclic loading encountered during the life of the well. In an embodiment, sealant compositions comprising a solid latex may have an increased latex content compared to sealant compositions comprising latex emulsions. Sealant compositions comprising a high latex content may display a reduced gas migration during cement settling and reduced fluid loss when compared to similar compositions having a lower latex content.

The sealant compositions comprising a solid latex may be introduced to the wellbore to prevent the loss of aqueous or non-aqueous drilling fluids into loss-circulation zones such as voids, vugular zones, and natural or induced fractures while drilling. In an embodiment, the sealant composition comprising a solid latex is placed into a wellbore as a single stream and activated by downhole conditions to form a barrier that substantially seals loss circulation zones. In such an embodiment, the sealant composition may be cementless. Such compositions may further comprise a pH-increasing additive in encapsulated or unencapsulated form. In an embodiment, the sealant composition comprising a solid latex and a mud (e.g., WBM or OBM) may function as a fracture sealant slurry that may be used for drill ahead applications.

In yet another embodiment, a sealant composition may be formed downhole by the mixing of a first stream comprising a solid latex and a second stream comprising a cement slurry, a pH increasing material, or both. The streams may be introduced in any order desired by the user. Methods for introducing compositions into a wellbore to seal subterranean zones are described in U.S. Pat. Nos. 5,913,364; 6,167,967; and 6,258,757 which are incorporated by reference herein in their entirety and U.S. Pat. No. 6,926,081B2 which was previously disclosed.

The sealant composition comprising a solid latex may form a non-flowing, intact mass inside the loss-circulation zone which plugs the zone and inhibits loss of subsequently pumped drilling fluid, which allows for further drilling. In an embodiment, the sealant composition solidifies forming a mass which plugs the loss circulation zone at room temperature. Alternatively, the sealant composition solidifies forming a mass, which plugs the loss circulation zone at temperatures of from about 45° F. to about 400° F.

It is to be understood that, it may be desired to hasten the viscosification reaction for swift plugging of the voids. Alternatively, it may be desired to prolong or delay the viscosification for deeper penetration into the voids. For example the sealant may form a mass that plugs the zone at elevated temperatures, such as those found at higher depths within a wellbore.

In an embodiment, the sealant compositions may be employed in well completion operations such as primary and secondary cementing operations. Primary and secondary cementing operations refers to wellbore completion processes as known to those skilled in the art, and sealant compositions for use in such cementing operations may or may not contain cement. The sealant composition may be placed into an annulus of the wellbore and allowed to set such that it isolates the subterranean formation from a different portion of the wellbore. The sealant composition comprising a solid latex thus forms a barrier that prevents fluids in that subterranean formation from migrating into other subterranean formations. Within the annulus, the sealant composition also serves to support a conduit, e.g., casing, in the wellbore. In an embodiment, the wellbore in which the sealant composition is positioned belongs to a multilateral wellbore configuration. It is to be understood that a multilateral wellbore configuration includes at least two principal wellbores connected by one or more ancillary wellbores. When such compositions contain cement, the resulting sealant has improved mechanical properties to resist cyclic pressure and pressure induced stresses imposed during the well operations. When such sealant compositions do not contain cement, the sealant mass is resilient and may be characterized by a low elastic modulus and being well suited to sustain cyclic stresses during the well bore operations.

In secondary cementing, often referred to as squeeze cementing, the sealant composition may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth. Various procedures that may be followed to use a sealant composition in a wellbore are described in U.S. Pat. Nos. 5,346,012 and 5,588,488, which are incorporated by reference herein in their entirety.

In an embodiment, the sealant composition comprising solid latex but no cementitious material may be used in well completion operations such as primary operations (e.g., primary cementing). As an example, they may be placed behind expandable casings or used for consolidating gravel packs or incompetent formations. Further, such sealant compositions may be used in remedial operations such as secondary cementing, sealing leaks, cracks, or voids and forming temporary plugs for the purpose of isolating zones to divert subsequent fluids and the like.

Additional disclosure regarding the use of cementless sealant compositions for such applications can be found in U.S. Pat. Nos. 5,159,980 and 6,668,928, which are incorporated by reference herein in their entirety.

In other embodiments, additives are also pumped into the wellbore with the sealant composition. For instance, fluid absorbing materials, particulate materials, resins, aqueous superabsorbers, viscosifying agents, suspending agents, dispersing agents, or combinations thereof can be pumped in the stream with the sealant compositions disclosed.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

A sealant composition containing a solid latex and no cementitious material was prepared and the mechanical properties of the composition determined. A reconstituted solid latex emulsion was prepared by (a) blending a styrene-butadiene latex powder (33 grams) supplied by Rhodia Corporation as 04-0E-006 with a solid blend (40 grams) FLEXPLUG OBM lost circulation material which contains an organophilic clay; a viscosifying polymer xanthan gum; a particle dispersing sulfonated naphthalene-formaldehyde condensate; and sodium carbonate and is commercially available from Halliburton Energy Services (b) mixing the dry blend with water (95 ml) containing the liquid stabilizer surfactant (7.5 ml) sold as STABILIZER 434C latex stabilizer and DAIR 3000L antifoaming agent which is a defoamer both available from Halliburton Energy Services. The mixture was stirred until the viscosity and rheology of the emulsion stabilized.

Sealant composition sample A was formed by mixing the stabilized emulsion with an equal volume of OBM drilling fluid sold as INVERMUL RF by Baroid Drilling Fluids, and the resulting product did not form a viscous mass and had a yield point (YP) of 0 Pa. Sealant composition sample B, a comparative sample, was formed by mixing INVERMUL RF emulsifier which is a drilling fluid and a sealant composition formed by replacing the solid latex in the sealant composition Sample A with LATEX 2000 cement additive which is an aqueous latex emulsion commercially available from Halliburton Energy Services and reducing the water amount to 66 ml as described above. A viscous mass having a yield point of 2700 Pa was formed at room temperature in less than 10 minutes from sealant composition Sample B. Samples A and B were heated in a water bath at 180° F., and upon heating, the YP of both compositions increased. Specifically, Sample B having containing the aqueous latex had a YP increase from 2700 to 4100 Pa while Sample A having the solid latex had a YP increase from 0 to 2700 Pa.

The results demonstrate the ability of an OBM and solid latex composition to form a viscous mass. The retention of fluidity until the sealant composition was heated is an advantageous feature allowing for deeper penetration of the treatment into the fracture before solidification. This may improve the ability of the viscous mass to withstand the drilling fluid's hydrostatic pressure thus allowing for continued drilling at the same or increased mud density.

Example 2

A sealant composition similar to Sample A containing a solid latex and no cementitious material was prepared and the mechanical properties of the composition determined as described in Example 1. However, the composition did not contain the liquid stabilizer surfactant STABILIZER 434C latex stabilizer. The final results were similar to those described in Example 1 in which the stabilizing surfactant was used. These observations suggest that stabile emulsions can be obtained without using the surfactants.

Example 3

The ability of the sealant compositions containing a solid latex to prevent water-based mud (WBM) losses was examined. A solid latex suspension was formed by (a) blending styrene-butadiene latex powder (48 grams) with a solid blend (220 grams) containing an organophilic clay CLAYTONE II organophilic bentonite which is an organoclay commercially available from Southern Clay Products, a viscosifying polymer xanthan gum, and bentonite and (b) mixing the dry blend with a nonaqueous fluid such as diesel (350 ml). The slurry was then mixed with a WBM (350 ml). The resulting mixture formed a viscous mass with a yield point similar to a system that did not contain the dry latex however the surface of the viscous mass had a slick sheen created by the latex. The results demonstrate the ability of the sealant composition containing a solid latex to form a viscous mass when contacted with a WBM. Furthermore, the surface coating on the viscous mass could reduce the plastic viscosity of the mass allowing for a reduction in the required horsepower needed to the place the final product.

Example 4

A 16.4 pounds per gallon cement slurry was prepared with Class H cement, water (as specified in Table 1) and either solid latex or an aqueous latex emulsion according to *American Petroleum Institute (API) Recommended Practice 10B, 22nd Edition* 1997 with the exception that when aqueous latex emulsion was used the blender stirring rate was kept at 1000 rpm. The latex slurry was prepared by adding, DAIR 3000L antifoaming agent which is a defoamer and, STABILIZER 434C latex stabilizer (10% by volume of the latex) which is a nonionic surfactant both of which are available from Halliburton Energy Services to the latex in the mix water followed by addition of cement with agitation at 1000 rpm for 45 seconds. A control slurry comprising Class H cement and water was prepared according to the API Specification mentioned in Table 1. The mechanical property modification of cement compositions by the solid and aqueous latexes was measured by comparing the mechanical properties of the latex cement compositions to the control slurry. The slurries were poured into tensile dog-bone shaped briquettes according to the procedure described for the test CRD-C260-01 in the *U.S. Army Corps of Engineers' Handbook for Concrete and Cement*. The slurry was also poured into 2"×5" cylindrical brass molds to perform load versus displacement studies under unconfined conditions using MTS load frame equipment manufactured by MTS Systems Corporation of Eden Prairies, Minn. according to ASTM D3148-02 (Standard Test Method for Elastic Moduli of Intact Rock Core in Uniaxial Compression). The cylindrical samples and the tensile briquettes were cured in autoclave at 190° F. under a pressure of 3000 psi for 72 hrs. The tensile strengths were measured on a Tinius Olsen Strength Tester equipment. The results are presented in Table 1.

TABLE 1

| Water % by wt. of cement | Aqueous latex type | Amount of aqueous latex, gal/sk (% active content bwoc) | Solid Latex type | Solid Latex amount, bwoc | Slurry Density, ppg | Compressive Strength[3], psi | Tensile Strength, psi | Young's Modulus × $10^6$, psi | Poisson's ratio |
|---|---|---|---|---|---|---|---|---|---|
| 39.42 | None | | None | | 16.4 | 8230 | 430 | 2.34 | 0.207 |
| 33.2 | Styrene-butadiene | 0.7 (3.1%) | | | 16.3 | 4480 | 470 | 1.32 | 0.199 |
| 36.81 | | | Styrene Butadiene[1] | 2% | 16.4 | 8800 | 700 | 2.19 | 0.183 |
| 35.15 | | | Same | 4% | 16.4 | 9390 | 680 | 2.25 | 0.204 |
| 36.16 | | | Styrene Butadiene[2] | 4% | 16.4 | 7650 | 700 | 1.82 | 0.200 |

[1]From Rhodia Corporation
[2]From Dow Reichhold Corporation
[3]From load displacement measurements under unconfined conditions The results in Table 1 suggest that solid latexes provide substantially different mechanical properties than the aqueous latex fluids when added to cement. The results demonstrate that the addition of dry latex material to the above described cement compositions produce cement compositions with increased tensile strengths, compressive strengths and elastic moduli when compared to similar compositions prepared using aqueous latex emulsions.

Without intending to be limited by theory, this behavior may be a reflection of the timing difference between settling of cement and the time it takes for the dry latex to achieve the same structural form as that in the original aqueous latex. One consequence of this timing difference is the different degrees of film forming of a latex when added to a cement slurry in the aqueous or dry form.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore comprising:
providing a dry blend comprising a modified latex and a cement, wherein the modified latex is prepared by removing water from an emulsion polymerized latex system;
mixing the dry blend with a non-aqueous solution to form a sealant composition; and
placing the sealant composition into the wellbore.

2. The method of claim 1 wherein the emulsion polymerized latex system comprises vinyl aromatic monomers, ethylene, butadiene, vinyinitrile, olefinically unsaturated esters of $C_1$-$C_8$ alcohol, ethylenically unsaturated carboxylic acids or combinations thereof.

3. The method of claim 1 wherein the emulsion polymerized latex system comprises a colloidally stabilized latex, an alkali swellable latex or combinations thereof.

4. A method comprising:
providing a modified latex, wherein the modified latex is prepared by removing water from an emulsion polymerized latex system;
reconstituting the modified latex;
incorporating the reconstituted modified latex into a wellbore servicing fluid; and
placing the wellbore servicing fluid down a wellbore, wherein the modified latex is reconstituted by mixing a latex in a dry particulate state with a non-aqueous solution.

5. The method of claim 1 wherein the sealant composition further comprises an anionic surfactant, a nonionic surfactant, a zwitterionic surfactant or combinations thereof.

6. The method of claim 1 wherein the modified latex is an alkali swellable modified latex or and the sealant composition further comprises a pH-increasing material.

7. The method of claim 6 wherein the pH-increasing material is an alkali metal hydroxide, alkaline earth metal hydroxide, transition metal hydroxide, carbonate, bicarbonate, phosphate, organic amine, or combinations thereof.

8. The method of claim 1 wherein the sealant composition further comprises an organophilic clay.

9. The method of claim 1 wherein the sealant composition further comprises a viscosifier.

10. The method of claim 4 wherein the we bore servicing fluid comprises a drilling mud.

11. The method of claim 10 wherein the drilling mud comprises a pH-increasing material and the modified latex is an alkali swellable modified latex.

12. The method of claim 1 wherein the sealant composition further comprises a cross-linking agent, a vulcanization accelerator, a vulcanization retarder, or combinations thereof.

13. The method of claim 12 wherein the cross-linking agent comprises sulfur, 2,2'-dithiobisbenzothiazole, organic peroxides, azo compounds, alkylthiuram disulfides, selenium phenolic derivatives, or combinations thereof.

14. The method of claim 12 wherein the vulcanization accelerators comprises a fatty acid, metallic oxide, aldehyde amine compound, guanidine compounds, disulfide thiuram compounds, or combinations thereof.

15. The method of claim 12 wherein the vulcanization retarder comprises salicylic acid, sodium acetate, phthalic anhydride, N-cyclohexyl thiophthalimide, defoamers, or combinations thereof.

16. The method of claim 1 wherein servicing the wellbore comprises completing the wellbore.

17. The method of claim 1 wherein servicing the wellbore comprises primary or secondary cementing of the wellbore.

18. The method of claim 1 wherein servicing the wellbore comprises reestablishing circulation following a loss of circulation in the wellbore.

19. The method of claim 18 further comprising drilling ahead upon reestablishing circulation in the wellbore.

20. The method of claim 1 wherein servicing the wellbore comprises sealing a permeable zone in the wellbore.

21. The method of claim 1 wherein the wellbore servicing comprises wellbore pressure containment integrity operations.

* * * * *